(12) United States Patent
Iwami et al.

(10) Patent No.: US 7,216,733 B2
(45) Date of Patent: May 15, 2007

(54) SMALL-SIZED VEHICLE

(75) Inventors: Kazuaki Iwami, Shizuoka-Ken (JP); Katsuhisa Shimizu, Shizuoka-Ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 239 days.

(21) Appl. No.: 10/975,573

(22) Filed: Oct. 28, 2004

(65) Prior Publication Data

US 2005/0257972 A1 Nov. 24, 2005

Related U.S. Application Data

(60) Provisional application No. 60/573,417, filed on May 24, 2004.

(51) Int. Cl.
*B60K 11/00* (2006.01)

(52) U.S. Cl. .................. 180/68.1; 180/68.4; 180/68.5; 180/443

(58) Field of Classification Search ............... 180/68.1, 180/68.2, 68.4, 68.6, 68.5, 443, 444, 908
See application file for complete search history.

(56) References Cited

U.S. PATENT DOCUMENTS

| 5,660,244 | A | * | 8/1997 | Matsuda | 180/68.1 |
| 5,689,953 | A | * | 11/1997 | Yamashita et al. | 60/316 |
| 5,887,671 | A | * | 3/1999 | Yuki et al. | 180/68.1 |
| 6,668,966 | B2 | * | 12/2003 | Hasegawa et al. | 180/417 |
| 6,776,250 | B2 | * | 8/2004 | Kuji et al. | 180/68.3 |
| 6,786,290 | B2 | * | 9/2004 | Kuji et al. | 180/68.1 |
| 6,966,399 | B2 | * | 11/2005 | Tanigaki et al. | 180/444 |
| 7,070,019 | B2 | * | 7/2006 | Takamoto et al. | 180/403 |

* cited by examiner

*Primary Examiner*—Christopher P. Ellis
*Assistant Examiner*—Brian Swenson
(74) *Attorney, Agent, or Firm*—Keating & Bennett, LLP

(57) ABSTRACT

A small-sized vehicle is capable of inhibiting the temperature of a battery that supplies an electric motor of a power steering apparatus with a power source from increasing. A battery which supplies the electric motor of the power steering apparatus with the power source is arranged so as not to directly receive cooling air that passes through a radiator.

21 Claims, 5 Drawing Sheets

SMALL-SIZED VEHICLE

Applicant(s) claim(s) benefit under 35 U.S.C. § 119(e) of U.S. provisional application No. 60/573,417 filed May 24, 2004.

BACKGROUND OF THE INVENTION

1. Field of the Invention

The present invention relates to, for example, a small-sized vehicle such as a saddle type three-wheel or four-wheel vehicle used for farming, an ATV (All Terrain Vehicle) for sportive traveling off-road, a golf cart, and other small-sized vehicles. More specifically, the present invention relates to a small-sized vehicle having an electric motor-driven power steering apparatus.

2. Description of the Related Art

Generally, a small-sized vehicle used for traveling off-road has the following structure. Front and rear wheels each having a balloon tire with low pressure and wide diameter are disposed at the front and rear of a vehicle body frame, and an engine unit is mounted between the front and rear wheels. Further, a steering shaft is arranged between the left and right front wheels, and a wheel-type steering handle or a bar-type steering handle is attached to the upper end of the steering shaft. A small-sized vehicle of this type can travel off-road at will by turning the steering handle from side to side.

In recent years, some users expect further operational improvements when maneuvering the small-sized vehicle so as to reduce a load on operating the steering handle.

Accordingly, an electric motor-driven power steering apparatus which is connected to a steering shaft to thereby supply the steering shaft with an assisting steering force from the electric motor has been suggested.

When the power steering apparatus is provided, a battery is required to be mounted on the vehicle for supplying the electric motor with a power source. Preferably, the battery is arranged in the vicinity of the electric motor, that is, in the vicinity of the steering shaft. Further, a radiator for cooling engine cooling water using moving air is often provided in front of the steering shaft. In this case, the cooling air that passes through the radiator is applied to the battery depending upon the location of the battery. Meanwhile, the battery generates heat due to chemical reactions in the battery, such that the battery must appropriately emit the heat. However, when the cooling air that passes through the radiator is applied to the battery, the battery is inhibited from emitting the heat. Therefore, problems arise in that the performance and operating life of the battery deteriorate.

SUMMARY OF THE INVENTION

To overcome the problems described above, preferred embodiments of the present invention provide a small-sized vehicle including an electric motor-driven power steering apparatus, and the small-sized vehicle is constructed so as to prevent the performance and operating life of a battery supplying an electric motor with a power source from deteriorating, by facilitating heat emission of the battery and by preventing the temperature of the battery from increasing.

Another preferred embodiment of the present invention provides a small-sized vehicle that prevents the performance and operating life of a power steering control unit controlling operation of a power steering apparatus from deteriorating by promoting heat emission of the control unit and by preventing the temperature of the control unit from increasing.

According to preferred embodiments of the present invention, when a power steering apparatus supplying a steering shaft with an assisting steering force and a radiator cooling engine cooling water with outside air are provided, the steering shaft is tilted rearward, and a battery supplying an electric motor of the power steering apparatus with a power source is disposed between the steering shaft and the radiator when viewed from a vehicle side and is arranged to prevent the battery from directly receiving cooling air that passes through the radiator.

According to preferred embodiments the present invention, the battery for the electric motor is arranged between the steering shaft tilted rearward and the radiator such that the battery does not directly receive the cooling air that passes through the radiator. Thus, a space for arranging the battery is easily provided, and at the same time, the cooling air that passes through the radiator does not prevent the battery from emitting heat.

According to one preferred embodiment of the present invention, the battery is accommodated in a container arranged between the steering shaft and the radiator when viewed from a vehicle side.

In this preferred embodiment, the container prevents the battery from directly receiving the cooling air, and therefore, the heat emission of the battery is not inhibited by the cooling air that passes through the radiator.

According to another preferred embodiment of the present invention, the container includes an opening on an upper portion thereof, and further includes a guide portion extending forward over and past the radiator with a bonnet arranged thereabove. Alternatively, an introducing passage is connected to the container for introducing moving air into the container.

In this preferred embodiment, the battery is prevented from directly receiving the cooling air that passes through the radiator, and the moving air is guided through the guide portion and the bonnet or through the introducing passage. Therefore, the battery emits heat more efficiently.

According to still another preferred embodiment of the present invention, an engine control unit controlling the operating state of an engine is also provided in the container.

In this preferred embodiment, similarly, the engine control unit is not inhibited from emitting heat by the cooling air that passes through the radiator.

According to still another preferred embodiment of the present invention, a cooling fan is arranged on the rear side of the radiator so as to be displaced toward one side in the vehicle width direction, and the battery is arranged so as to be displaced toward the other side of the cooling fan in the vehicle width direction.

In this preferred embodiment, the cooling air from the cooling fan is diverted so as to flow away from the battery, and therefore, the battery is not inhibited from emitting heat by the cooling air that passes through the radiator.

According to still another preferred embodiment of the present invention, the electric motor of the power steering apparatus is arranged on the same side in the vehicle width direction as the cooling fan, and an air shroud for guiding the cooling air that passes through the radiator to the electric motor is provided on the rear side of the radiator.

In this preferred embodiment, the cooling air that passes through the radiator cools the electric motor of the power steering apparatus without being applied to the battery. It should be noted that the electric motor operates at an extremely high temperature, such that the electric motor is cooled sufficiently even with the cooling air that passes through the radiator which is thereby increased in temperature.

According to preferred embodiments of the present invention, when a small-sized vehicle has a power steering apparatus and a radiator, a steering shaft is tilted rearward, and a power steering control unit controlling operation of the power steering apparatus is arranged between the steering shaft and the radiator when viewed from a vehicle side, so as to prevent a battery from directly receiving a cooling air that passes through the radiator.

According to preferred embodiments of the present invention, a power steering control unit is arranged between a steering shaft that is tilted rearward and a radiator, such that a battery is prevented from directly receiving a cooling air that passes through the radiator, and so that a space for arranging the control unit is provided, and at the same time, the cooling air at an increased temperature is not applied to the control unit and therefore, does not inhibit the control unit from emitting heat.

According to one preferred embodiment of the present invention, the power steering control unit is arranged above the axis of a cooling fan arranged on the rear side of the radiator.

In this preferred embodiment, the power steering control unit is arranged above the cooling fan, such that the power steering control unit is prevented from receiving the cooling air directly from the cooling fan.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Figure 1:
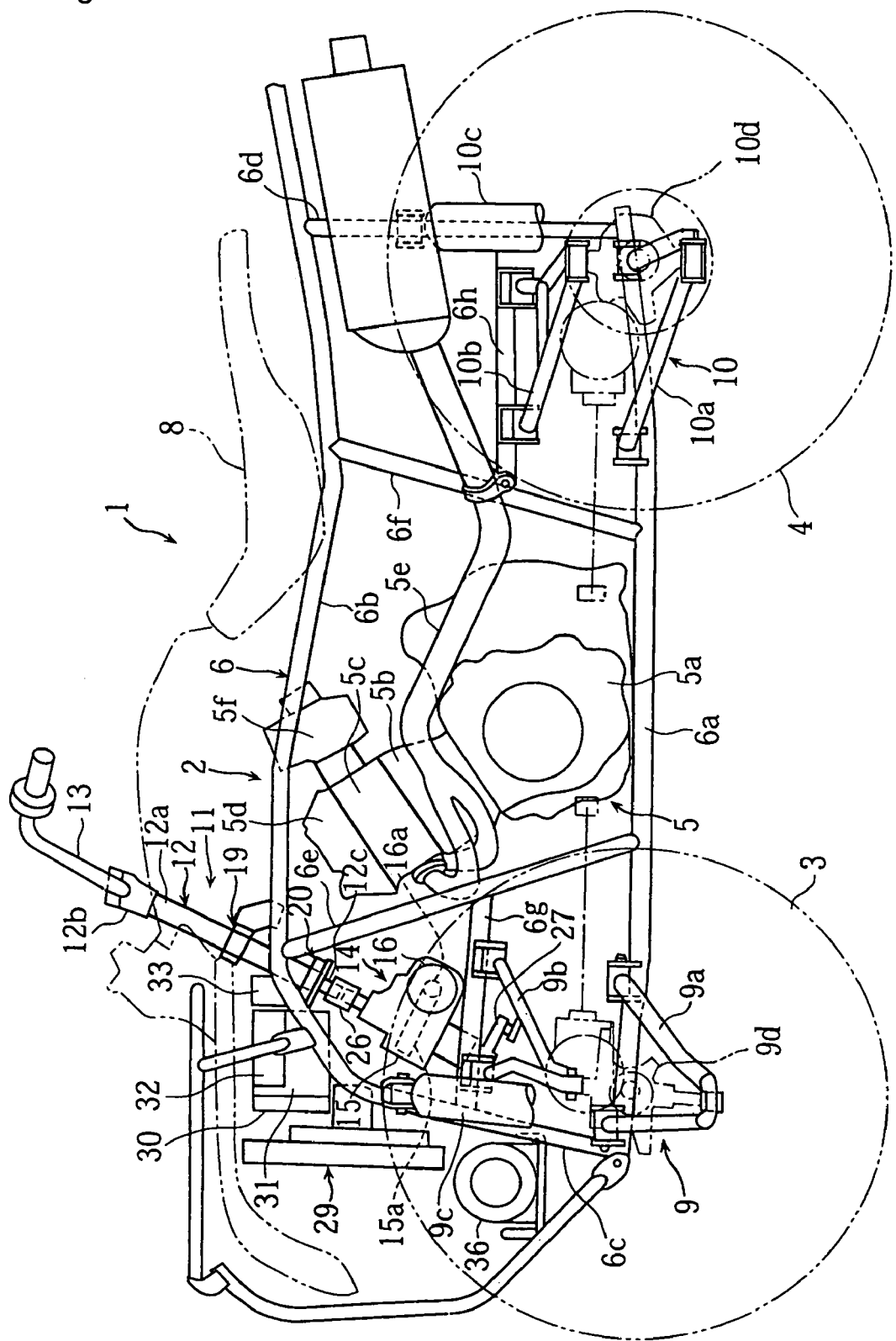
FIG. 1 is a left side view of a small-sized vehicle for traveling off-road according to one preferred embodiment of the present invention, in which some components are shown by solid lines, and some components are shown by chain-double dashed lines and dotted lines.
Figure 2:
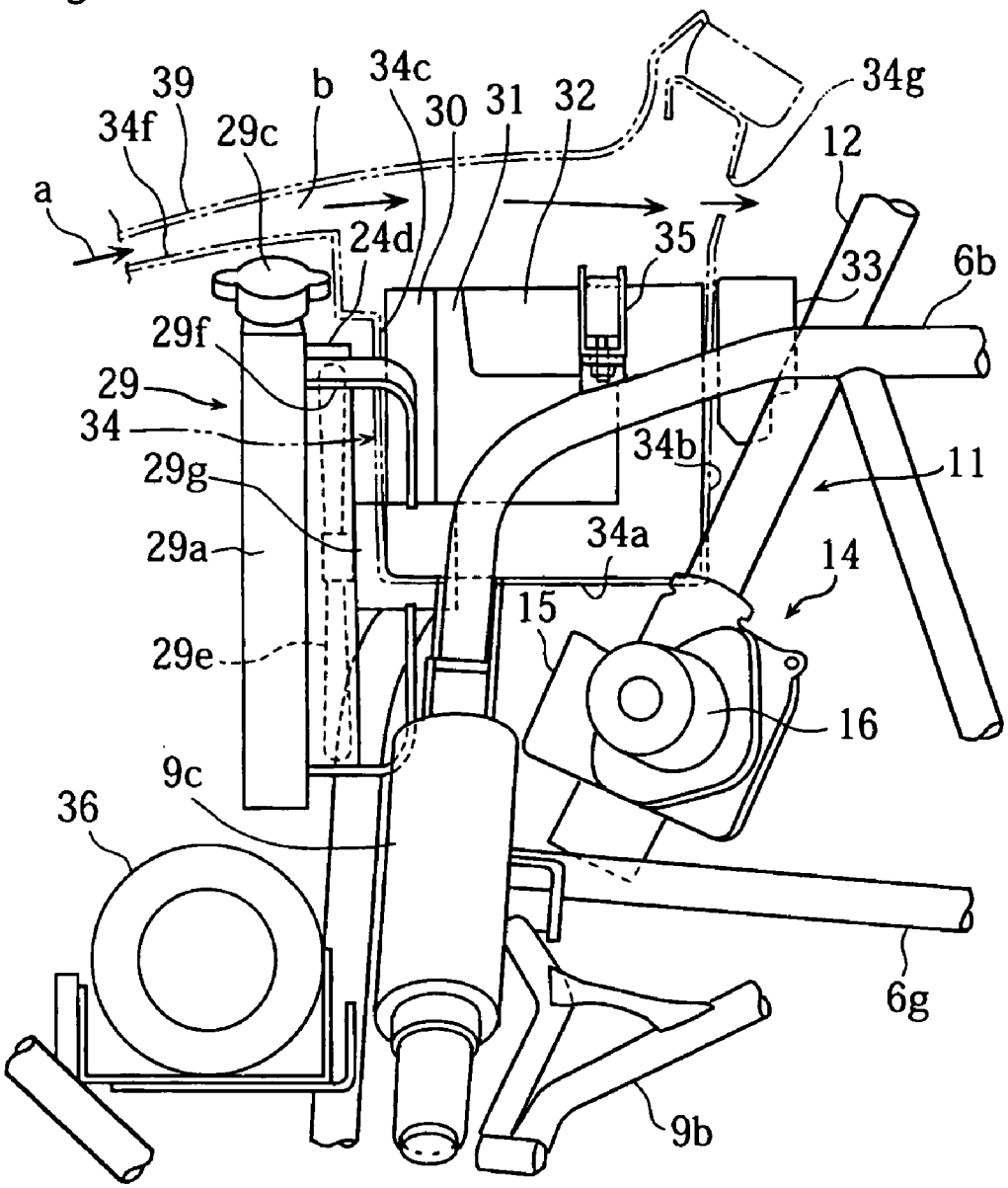
FIG. 2 is a left side view of the front portion of the small-sized vehicle according to the above-described preferred embodiment, in which a structural arrangement of vehicle components, such as a radiator, an electric motor, and a battery are shown.

Hereinafter, preferred embodiments according to the present invention will be described with reference to the attached drawings. Note that the indications of front, rear, left, and right in the description of the preferred embodiments represent the front, rear, left, and right from an operator seated on a seat of the small-sized vehicle.

In FIG. 1 to FIG. 5, "1" denotes a small-sized vehicle for traveling off-road. This small-sized vehicle 1 includes a vehicle body frame 2, left and right front wheels 3, 3 arranged at left and right front portions of the vehicle body frame 2, left and right rear wheels 4, 4 disposed at left and right rear portions of the vehicle body frame 2, an engine unit 5 mounted between the front wheel 3 and the rear wheel 4 of the vehicle body frame 2, and a steering system 11 disposed between the left and right front wheels 3, 3.

The vehicle body frame 2 is a double cradle type frame in which left and right side frames 6, 6 are connected by a plurality of cross pipes. Each of the side frames 6 has a lower pipe 6a arranged approximately at a height of the axes of the front and rear wheels 3, 4 and extending in a front to rear direction, and an upper pipe 6b arranged approximately at a height of the lower portion of a saddle type seat 8 and extending in the front to rear direction. At the front end portion of the upper pipe 6b, a front-end vertical pipe 6c is formed by bending the upper pipes so as to extend downward. The lower end portion of the front-end vertical pipe 6c is connected to the front end portion of the lower pipe 6a. Further, the lower pipe 6a and the upper pipe 6b are connected with each other by a rear-end vertical pipe 6d, and intermediate vertical pipes 6e, 6f on the front and rear sides, respectively. Furthermore, the front-end vertical pipe 6c and the intermediate vertical pipe 6e on the front side, and the rear-end vertical pipe 6d and the intermediate vertical pipe 6f on the rear side are coupled to each other by intermediate horizontal pipes 6g, 6h arranged in parallel with the lower pipe 6a, respectively.

The engine unit 5 is mounted in the space surrounded by the lower and upper pipes 6a, 6b, and the front and rear intermediate vertical pipes 6e, 6f. In front of an engine case 5a having a built-in crankshaft of the engine unit 5 and a built-in variable speed gear, a cylinder block 5b, a cylinder head 5c, and a head cover 5d are stacked and fastened. Further, an exhaust unit 5e is connected to the front wall of the cylinder head 5c. The exhaust unit 5e extends rearward at a height of the cylinder block 5b. Further, a carburetor is connected to the rear wall of the cylinder head 5c.

The left and right front wheels 3, 3 are supported by a double wishbone type front-wheel suspension system 9 in a vertically swingable and horizontally steerable manner. The front-wheel suspension system 9 includes a lower arm 9a supported by the front portion of the lower pipe 6a in a vertically swingable manner, an upper arm 9b supported by the intermediate horizontal pipe 6g on the front side in a vertically swingable manner, and a cushion unit 9c disposed between the front-end vertical pipe 6c and the lower arm 9a.

Also, the left and right rear wheels 4, 4 are supported by a double wishbone type rear-wheel suspension system 10 in a vertically swingable manner. The rear-wheel suspension system 10 includes a lower arm 10a supported by the rear portion of the lower pipe 6a in a vertically swingable manner, an upper arm 10b supported by the intermediate horizontal pipe 6h on the rear side in a vertically swingable manner, and a cushion unit 10c disposed between the rear-end vertical pipe 6d and the lower arm 10a.

Between tip portions of the lower arm 9a and the upper arm 9b, a knuckle 9d for the front wheel 3 is coupled to the lower arm 9a and the upper arm 9b via a ball joint so as to support the front wheel 3 in a rotatable manner. Similarly, between the lower arm 10a and the upper arm 10b, a knuckle 10d for the rear wheel is coupled to the lower arm 10a and the upper arm 10b in an axially rotatable manner so as to support the rear wheel 4 in a rotatable manner.

The steering system 11 includes a steering shaft 12 arranged substantially at the center of the front wheels 3, 3, a steering handle 13 attached to the upper end of the steering shaft 12, and an electric motor-driven power steering apparatus 14 connected to the lower end of the steering shaft 12. The lower end portion of the steering shaft 12 and an input shaft of the power steering apparatus 14 are connected by a connecting pipe 26 to form a substantially straight line. Further, the steering shaft 12 is arranged so as to be tilted rearward.

The steering shaft 12 includes a cylindrical column portion 12a, a bracket 12b for mounting a handle which is fixed to the upper end portion of the cylindrical column portion 12a and to which the steering handle 13 is mounted in a detachable manner and, and a coupling shaft portion 12c coaxially fixed at the lower end portion thereof.

The coupling shaft portion 12c is axially supported by the vehicle body frame 2 via a lower bearing 20, and a central portion in the axial direction of the column portion 12a is axially supported by the vehicle body frame 2 via an upper bearing 19.

The power steering apparatus 14 includes a reduction gear 15, and an electric motor 16 integrally fixed to a gear case of the reduction gear 15. A worm 16a attached to an output shaft of the electric motor 16 is engaged with a worm wheel 15a in the reduction gear 15. A lower projection of the output shaft of the reduction gear 15 is coupled to the knuckle 9d for the left and right front wheels via a pitman arm 27 and a tie rod (not-shown). Incidentally, the reduction gear 15 is fixed such that it is disposed above the left and right intermediate horizontal pipes 6g, 6g of the vehicle body frame 2.

Here, the worm 16a attached to the output shaft of the electric motor 16 is engaged with the rear side portion of the steering shaft 12 of the worm wheel 15a in the reduction gear 15. More specifically, the engaged portion is arranged at approximately the center line L of the vehicle. The electric motor 16 extends leftward in the vehicle width direction from the center line L of the vehicle.

In front of the steering system 11, a winch 36 is provided, and on the upper side of the winch 36, a radiator 29 is provided for cooling the cooling water of the engine unit 5. Incidentally, the winch 36 includes a wire cable having a hook at its tip portion that is wound around a drum that is driven to rotate by a motor, and the winch 36 is used, for example, to extricate the small-sized vehicle if the small-sized vehicle gets stuck in a swamp.

The radiator 29 has a substantially tabular shape and includes a pair of left and right side tanks 29a, 29a that extend vertically, and an element 29b arranged between both of the side tanks 29a, 29a that functions as a heat exchanger. On the rear side of the element 29b, a fan case 29d is provided having an opening at its rear end and arranged to be displaced toward the left side in the vehicle width direction. The fan case 29d covers substantially the left half of the element 29b and includes a cooling fan 29e disposed therein. A fan motor 29g which drives the cooling fan 29e projects rearward from the fan case 29d. Incidentally, a bracket for fixedly supporting the fan motor 29g to the rear surface side of the element 29b is denoted by "29f", and "29c" is a cap for an opening from which the cooling water is supplied into the side tank 29a.

Here, the radiator 29 is mounted in the vehicle body frame 2 such that a center line in the vehicle width direction of the radiator 29 and a center line L in the width direction of the vehicle substantially coincide with each other. Accordingly, the cooling fan 29e is arranged so as to be displaced toward the left side from the center line L of the vehicle. As a result, the electric motor 16 is located on the same side of the center line L as the cooling fan 29e, that is, just behind the cooling fan 29e and the position of the electric motor 16 enables it to easily receive the cooling air from the cooling fan 29e.

Between the radiator 29 and the steering system 11, various vehicle components are provided, such as a battery 30, an engine control unit 31 for the engine unit 5, a power steering control unit 32 for the power steering apparatus, a relay 33, and other components. Note that the battery 30 can be used for the power steering apparatus, such as the electric motor for the power steering apparatus, the winch, and the engine, such as a starter for starting the engine.

A container 34 which accommodates the battery 30 is disposed between the radiator 29 and the steering shaft 12 of the steering system 11 when viewed from a vehicle side. The container 34 has a box shape having a bottom wall 34a and a peripheral wall 34b having a stepped configuration as will be described later, and having an opening 34c on the upper portion thereof.

A portion of the container 34 that is on the right side of the center line L of the vehicle defines a battery housing portion "c" in which the battery 30 is disposed, and a portion of the container 34 that is on the left side of the center line L of the vehicle defines a unit housing portion "d" in which the power steering control unit 32 is disposed. The battery housing portion c is substantially deeper than the unit housing portion d so as to accommodate the battery 30 having a rectangular parallelepiped shape in a vertical orientation. The portion of the bottom portion 34" corresponding to shallower unit housing portion d accommodates the power steering control unit 32 having a shape of a thick plate in a horizontal dimension thereof. Still further, the control unit 31 for the engine 5 has a shape of a thick plate and is located vertically between the battery 30 and the power steering control unit 32. The portion of the bottom portion 34a corresponding to the engine control unit 31 is slightly shallower than the bottom wall 34a' of the battery housing portion c.

A fixing stay 35 is disposed so as to cover the control units 31, 32. The fixing stay 35 is disposed above the left and right upper pipes 6b, 6b of the vehicle body frame 2. Both end portions 35a, 35a of the fixing stay 35 are fastened and fixed by a bolt 34e in a detachable manner to a bracket 6b' together with an opening edge portion 34d of the container 34. The container 34 is thereby fixed to the upper pipes 6b, 6b and the battery 30 and the control units 31, 32 are fixed in the container 34.

Further, on the front edge of the opening 34c of the container 34, a guide portion 34f is bent forward. The guide portion 34f extends forward over and past the radiator 29. On the rear wall of the container 34, an outlet 34g is provided for the moving air. Above the battery 30 and the radiator 29, a bonnet 39 is disposed. Between the bonnet 39, the guide portion 34f and the outlet 34g, a passage "b" is provided. Along the passage "b", the moving air "a" flows rearward from the front of the small-sized vehicle.

According to this preferred embodiment, the battery 30 and the control units 31, 32 are arranged between the steering shaft 12 and the radiator 29 when viewed from a vehicle side, such that the space required for these components is easily provided. Further, in this case, the battery 30 and the control units 31, 32 are arranged and accommodated in the container 34. Accordingly, with this container 34, the control units 31, 32 and the battery 30 are prevented from directly receiving the cooling air that passes through the radiator 29, such that the heat emission by the battery 30 is not inhibited by the cooling air that passes through the radiator 29.

Further, the container 34 includes the outlet 34c on its upper portion, and the guide portion 34f extending forward over and past the radiator 29. With the container 34 and the bonnet 39 arranged above the container 34, the passage "b" for air flow is formed. Hence, the traveling air "a" is guided through the passage "b" between the guide portion 34f and the bonnet 39 to the battery 30 and the control units 31, 32 to flow out through the outlet 34g rearward. As a result, with the moving air "a", the battery 30 and the control units 31, 32 emit heat more efficiently.

Here, the passage "b" is preferably defined by the bonnet 39 and the guide portion 34f of the container 34. However, a separate and independent introducing passage having a duct shape could be connected to the container 34. In this case, preferably, a front edge opening of the introducing passage is arranged at a location that allows the moving air to enter, but does not allow the cooling air that passes through the radiator to enter. In addition, on the rear wall of the container 34, an outlet for the allowing the moving air to exit the container 34 must be provided.

The cooling fan 29e of the radiator 29 is arranged so as to be displaced toward the left side in the vehicle width direction from the center line L of the vehicle, while the battery 30 is arranged so as to be displaced toward the right side in the vehicle width direction from the center line L of the vehicle, that is, on the opposite side of the cooling fan. Therefore, the cooling air that is blown by the cooling fan 29e flows on the opposite side of the vehicle from the battery 30 (left side), such that, the heat emission of the battery 30 is not inhibited by the cooling air that passes through the radiator 29.

Further, the power steering control unit 32 is disposed above the axis of the cooling fan 29e of the radiator 29. Therefore the cooling air from the cooling fan 29e flows below the bottom wall 34a", such that the cooling air is rarely directed to the power steering control unit 32. Thus, the heat emission of the power steering control unit 32 is not inhibited by the cooling air that passes through the radiator 29.

Here, as previously described, the cooling air that passes through the radiator 29 has an increased temperature, which inhibits the heat emission of the battery 30 if directed thereto. Nevertheless, the temperature of the electric motor 16 of the power steering apparatus 14 is much higher than that of the cooling air, such that the electric motor 16 can be cooled by the cooling air.

In this preferred embodiment, the electric motor 16 is arranged so as to be displaced toward the left side in the vehicle width direction from the center line L of the vehicle in the vehicle width direction, and the cooling fan 29e is arranged so as to be displaced toward the same side of the vehicle as of the electric motor 16. Specifically, the electric motor 16 is arranged behind the cooling fan 29e disposed on the rear side of the radiator 29. Accordingly, even when traveling at low speeds and very little moving air is present, the cooling air from the cooling fan 29e is applied to the electric motor 16, such that the electric motor 16 is cooled.

Figure 3:
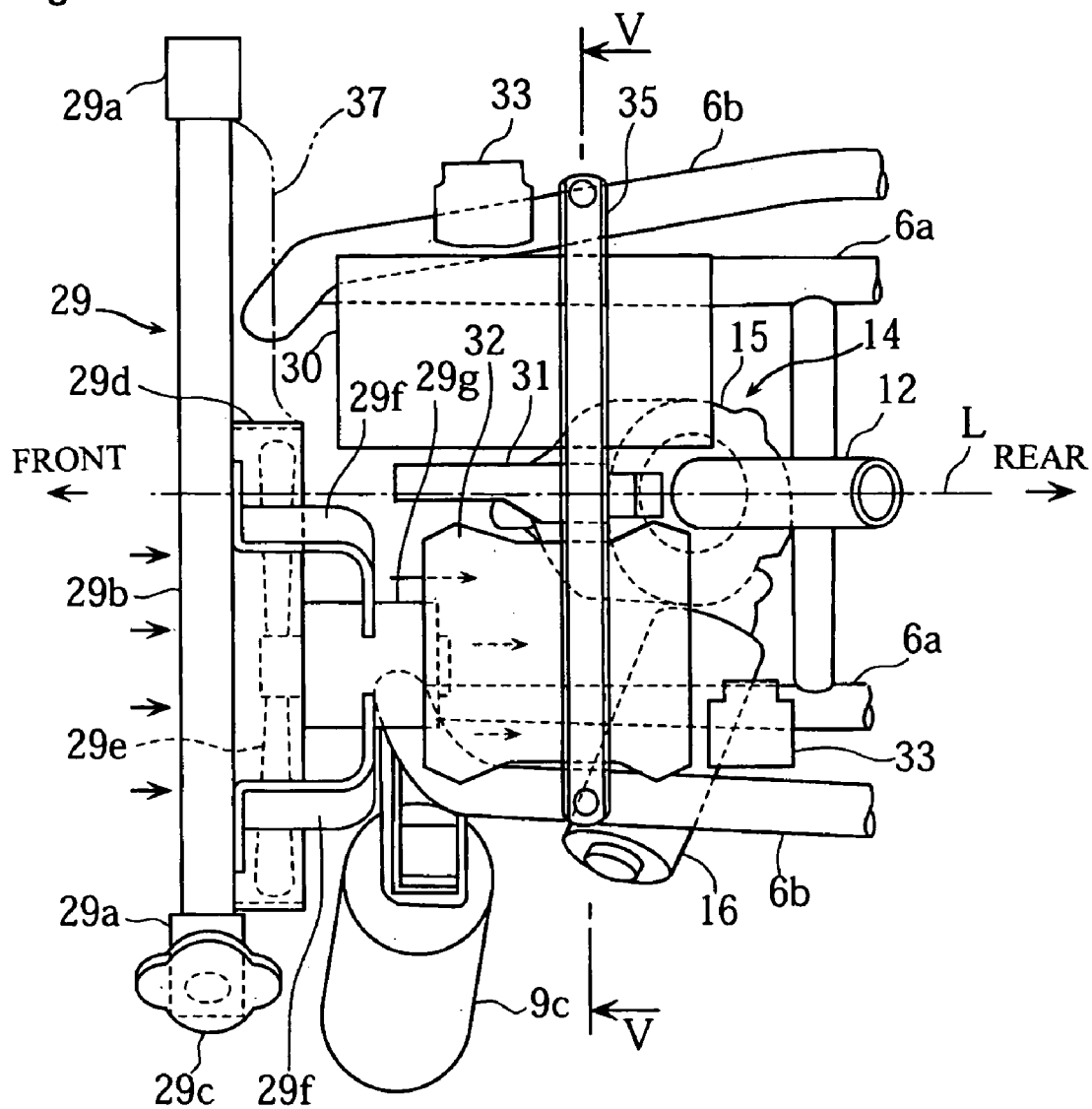
FIG. 3 is a plan view of the front portion of the small-sized vehicle according to the above-described preferred embodiment, in which the structural arrangement of the vehicle components, such as the radiator, the electric motor, and the battery are shown.
Figure 4:
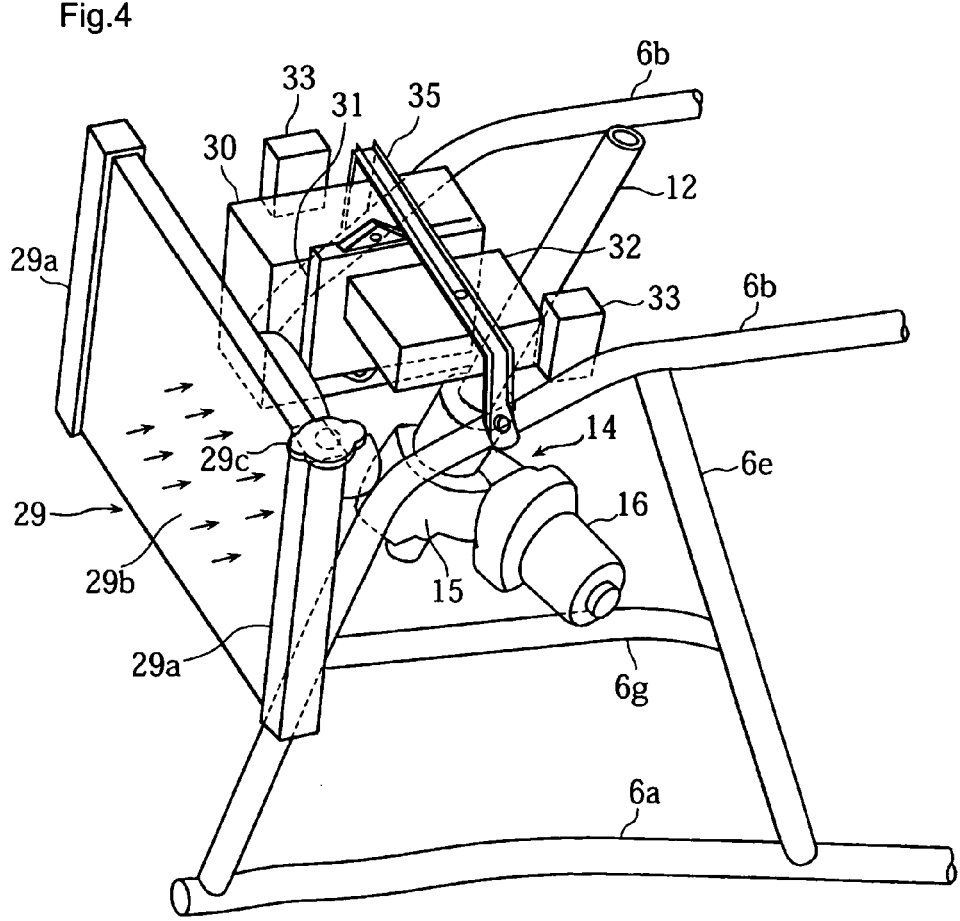
FIG. 4 is a perspective view showing the structural arrangement of the vehicle components such as the radiator, the electric motor, and the battery of the small-sized vehicle according to a preferred embodiment of the present invention.
Figure 5:
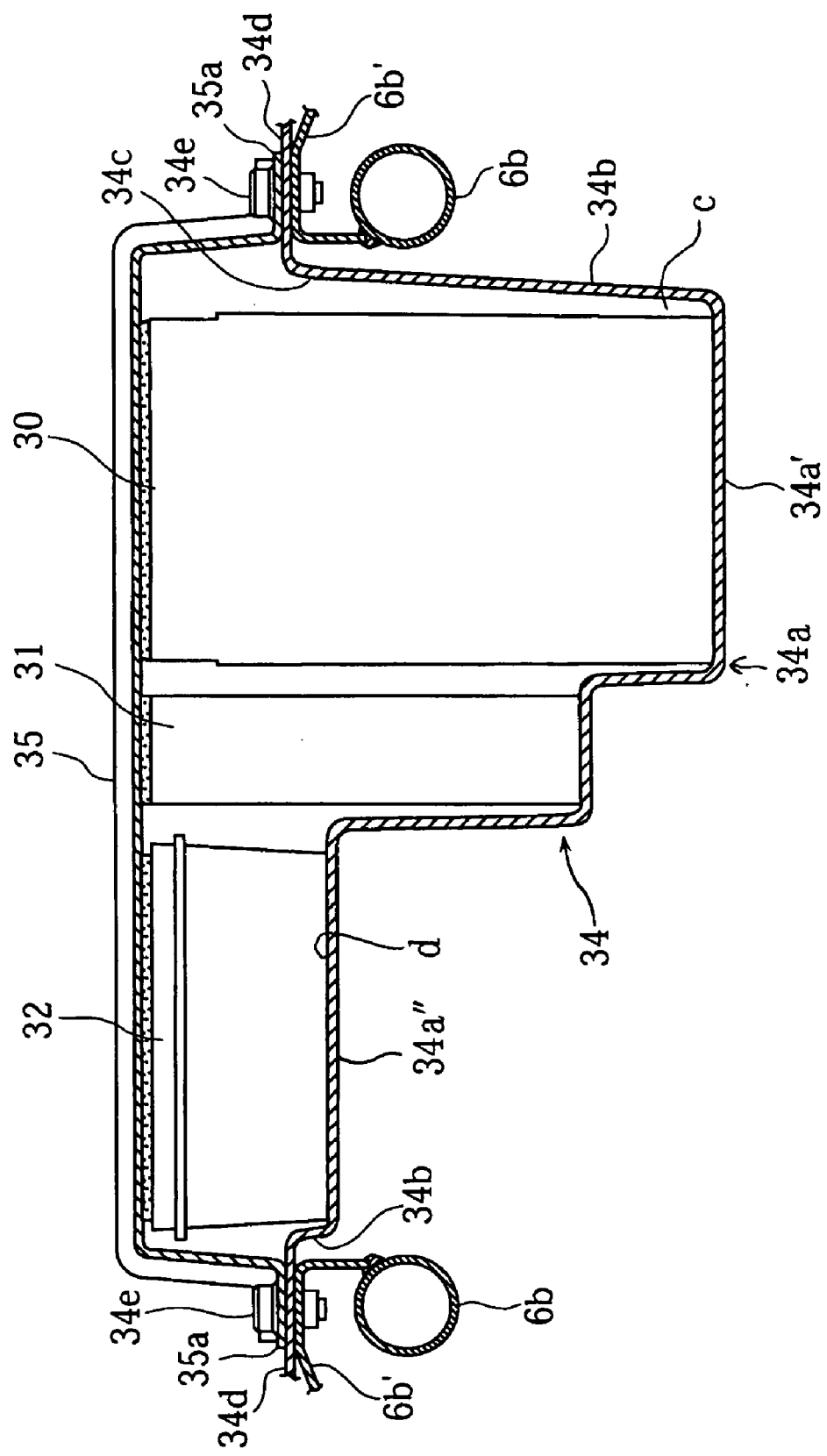
FIG. 5 is a sectional view showing a structural arrangement of the battery, a control unit, and other components of the small-sized vehicle according to the a preferred embodiment of the present invention.

Incidentally, as shown by chain-double dashed lines in FIG. 3, an air shroud 37 may be provided on the rear side of the radiator 29 for guiding the cooling air that passes through the radiator 29 to the electric motor 16. With the air shroud 37 being thus provided, the cooling air is guided to the electric motor 16 more efficiently by increasing the flow velocity of the cooling air. In this case, the battery 30 and the control units 31, 32 are arranged outside of the air shroud 37, such that the cooling air that passes through the radiator 29 is not directed to the battery 30.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A vehicle comprising:
   a vehicle body frame;
   an engine mounted to said vehicle body frame;
   a steering shaft supported by said vehicle body frame in a steerable manner;
   a power steering apparatus supplying said steering shaft with an assisting steering force and including an electric motor; and
   a radiator for cooling the engine with cooling water cooled with outside air, the radiator being positioned forward of the engine in a traveling direction of the vehicle; wherein
   said steering shaft is tilted rearward in a front-to-rear direction of the vehicle, and a battery for supplying the electric motor of said power steering apparatus with a power source is disposed between said steering shaft and said radiator as viewed from a vehicle side so as to prevent the battery from directly receiving a cooling air that passes through said radiator in the traveling direction of the vehicle.

2. The vehicle according to claim 1, further comprising:
   a container arranged between said steering shaft and said radiator as viewed from a vehicle side; wherein
   said battery is disposed in said container such that the container prevents the battery from directly receiving the cooling air that passes through said radiator.

3. The vehicle according to claim 2, wherein the container includes an opening at an upper portion thereof and a guide portion extending forward over and past said radiator with a bonnet arranged above the opening, such that moving air is guided between the guide portion and the bonnet to the battery.

4. The vehicle according to claim 2, wherein an introducing passage for introducing the moving air into the container is connected to the container.

5. The vehicle according to claim 2, wherein an engine control unit controlling an operating state of an engine is disposed in the container.

6. The vehicle according to claim 5, further comprising:
   a power steering control unit controlling operation of said power steering apparatus; wherein
   said power steering control unit is disposed in said container such that said engine control unit is disposed between said battery and said power steering control unit.

7. The vehicle according to claim 1, wherein a cooling fan is disposed on a rear side of said radiator and arranged so as to be displaced toward one side in the vehicle width direction and the battery is arranged so as to be displaced toward the other side in the vehicle width direction such that the cooling fan is spaced apart from the battery in the vehicle width direction.

8. The vehicle according to claim 7, wherein the electric motor of said power steering apparatus is arranged on the same side as the cooling fan in the vehicle width direction.

9. The vehicle according to claim 1, wherein an air shroud for guiding the cooling air that passes through said radiator to the electric motor is disposed on the rear side of said radiator, and the battery is arranged outside of the air shroud.

10. The vehicle according to claim 2, further comprising:
a power steering control unit disposed in said container and arranged to control operation of said power steering apparatus.

11. The vehicle according to claim 10, wherein the power steering control unit is disposed above an axis of a cooling fan arranged on a rear side of said radiator.

12. A vehicle comprising:
a vehicle body frame;
an engine mounted to said vehicle body frame;
a steering shaft supported by said vehicle body frame in a steerable manner;
a power steering apparatus supplying said steering shaft with an assisting steering force; and
a radiator for cooling the engine with cooling water cooled with outside air, the radiator being positioned forward of the engine in a traveling direction of the vehicle; wherein
a power steering control unit controlling operation of said power steering apparatus is arranged between said steering shaft and said radiator as viewed from a vehicle side and arranged so as to prevent the power steering control unit from directly receiving cooling air passed through said radiator in the traveling direction of the vehicle.

13. The vehicle according to claim 12, wherein the power steering control unit is disposed above an axis of a cooling fan arranged on a rear side of said radiator.

14. The vehicle according to claim 12, further comprising:
a container arranged between said steering shaft and said radiator as viewed from a vehicle side; wherein
said power steering control unit is disposed in said container such that the container prevents the power steering control unit from directly receiving the cooling air that passes through said radiator.

15. The vehicle according to claim 14, wherein the container includes an opening at an upper portion thereof and a guide portion extending forward over and past said radiator with a bonnet arranged above the opening, such that moving air is guided between the guide portion and the bonnet to the power steering control unit.

16. The vehicle according to claim 14, wherein an introducing passage for introducing the moving air into the container is connected to the container.

17. The vehicle according to claim 14, wherein an engine control unit controlling an operating state of an engine is disposed in the container.

18. The vehicle according to claim 12, further comprising:
a battery for supplying an electric motor of said power steering apparatus with a power source disposed between said steering shaft and said radiator as viewed from a vehicle side so as to prevent the battery from directly receiving a cooling air that passes through said radiator.

19. The vehicle according to claim 18, wherein a cooling fan is disposed on a rear side of said radiator and arranged so as to be displaced toward one side in the vehicle width direction and the battery is arranged so as to be displaced toward the other side in the vehicle width direction such that the cooling fan is spaced apart from the battery in the vehicle width direction.

20. The vehicle according to claim 19, wherein the electric motor of said power steering apparatus is arranged on the same side of the cooling fan in the vehicle width direction.

21. The vehicle according to claim 20, wherein an air shroud for guiding the cooling air that passes through said radiator to the electric motor is disposed on the rear side of said radiator, and the battery is arranged outside of the air shroud.

* * * * *